United States Patent
Chin et al.

(10) Patent No.: US 11,463,239 B2
(45) Date of Patent: Oct. 4, 2022

(54) VEHICLE, TERMINAL COMMUNICATING WITH THE VEHICLE, AND METHOD OF CONTROLLING THE VEHICLE

(71) Applicants: Hyundai Motor Company, Seoul (KR); Kia Motors Corporation, Seoul (KR)

(72) Inventors: Kyuhwan Chin, Seoul (KR); Minhwan Nam, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 80 days.

(21) Appl. No.: 16/834,540

(22) Filed: Mar. 30, 2020

(65) Prior Publication Data

US 2021/0111871 A1 Apr. 15, 2021

(30) Foreign Application Priority Data

Oct. 10, 2019 (KR) .................. 10-2019-0125053

(51) Int. Cl.
*H04L 29/06* (2006.01)
*G06F 21/00* (2013.01)
(Continued)

(52) U.S. Cl.
CPC .......... *H04L 9/0643* (2013.01); *H04L 9/0819* (2013.01); *H04L 9/0869* (2013.01); *H04W 4/40* (2018.02)

(58) Field of Classification Search
CPC ... H04L 9/0643; H04L 9/0819; H04L 9/0869; H04L 2209/80; H04L 2209/84; H04L 9/3242; H04L 9/0866; H04W 4/40; H04W 4/44; H04W 4/80; H04W 12/02; G07C 9/00309; G07C 9/00896;
(Continued)

(56) References Cited

U.S. PATENT DOCUMENTS

| 11,210,238 B2 * | 12/2021 | Avanindra | ............ G06F 21/602 |
| 2016/0080372 A1 * | 3/2016 | Martin | .................. H04W 12/50 |
| | | | 713/168 |

(Continued)

FOREIGN PATENT DOCUMENTS

WO WO-2019129346 A1 * 7/2019 ............ H04W 12/06

*Primary Examiner* — Lisa C Lewis
(74) *Attorney, Agent, or Firm* — Fox Rothschild LLP (57) ABSTRACT

A method of controlling a device performing communication with a terminal is provided. A random number is generated for attempting a communication connection with the terminal. Hashing is performed on the generated random number with a shared key using a hash-based message authentication code algorithm to obtain a hash value. The obtained hash value is encrypted to generate an advertising (ADV) signal. The generated ADV signal is periodically transmitted. Communication with the terminal is performed in response to receiving a communication connection signal from the terminal. At least one load is operated based on information transmitted from the terminal. The periodical transmission of the ADV signal includes periodically generating the random number, periodically generating the ADV signal in response to the periodic generation of the random number, and periodically transmitting the ADV signal.

19 Claims, 7 Drawing Sheets

(51) Int. Cl.
*H04L 9/06* (2006.01)
*H04W 4/40* (2018.01)
*H04L 9/08* (2006.01)

(58) Field of Classification Search
CPC .. G07C 2009/00412; G07C 2009/0046; B60R 25/2018; B60R 2325/108; B60R 2325/205; B60R 25/10
See application file for complete search history.

(56) References Cited

U.S. PATENT DOCUMENTS

| | | | |
|---|---|---|---|
| 2016/0212783 A1* | 7/2016 | Hampapuram | G16H 40/63 |
| 2017/0371322 A1* | 12/2017 | Lake | G01S 5/00 |
| 2018/0132077 A1* | 5/2018 | Kime | H04M 3/42008 |
| 2020/0079322 A1* | 3/2020 | Crocker | G07C 9/29 |
| 2020/0162896 A1* | 5/2020 | Su | A61M 5/14244 |
| 2020/0328885 A1* | 10/2020 | Tola | H04L 9/3066 |
| 2020/0382951 A1* | 12/2020 | Lee | H04W 12/041 |
| 2021/0084021 A1* | 3/2021 | Gibson | H04W 12/47 |
| 2021/0409951 A1* | 12/2021 | Klinkner | H04W 12/033 |
| 2022/0006800 A1* | 1/2022 | Duchastel | H04L 63/0823 |

* cited by examiner

VEHICLE, TERMINAL COMMUNICATING WITH THE VEHICLE, AND METHOD OF CONTROLLING THE VEHICLE

CROSS-REFERENCE TO RELATED APPLICATION

This application is based on and claims priority under 35 U.S.C. § 119 to Korean Patent Application No. 10-2019-0125053, filed on Oct. 10, 2019, the disclosure of which is incorporated herein by reference.

BACKGROUND

1. Field of the Disclosure

The present disclosure relates to a vehicle for preventing inadvertent transmission of personal information, a terminal communicating with the vehicle, and a method of controlling the same.

2. Description of the Related Art

Vehicles operate to lock or unlock a door or turn an ignition on or off with a key or a remote controller. The remote controller permits a door and a trunk to be opened or closed and an engine to be started only when the remote controller is carried by the driver. The remote controller also performs two-way communication with the vehicle. The remote controller, when approaching the vehicle, permits a door lock to be automatically released to open the door or trunk without a manual manipulation by the driver and permits the vehicle to be started based on a manipulation of a starter button without requiring a manual start of the vehicle.

Recently, technologies for enabling communication between a vehicle and a terminal have been developed. Accordingly, the user may control door opening/closing, door lock, and ignition of the vehicle using the terminal. However, information regarding the vehicle and the user may be inadvertently transmitted to the outside through a device that monitors signals transmitted and received between the vehicle and the terminal.

SUMMARY

The present disclosure provides a device for attempting communication with a terminal by periodically changing an advertising (ADV) signal and transmitting the changed ADV signal to the terminal, and a method of controlling the same. Additionally, the present disclosure provides a device for recognizing information regarding another device by receiving a changed ADV signal from the other device and analyzing the changed ADV signal. Additional features of the disclosure will be set forth in part in the description which follows and, in part, will be evident from the description, or may be learned by practice of the disclosure.

Specifically, the present disclosure provides a device that may include a storage configured to store a hash-based message authentication code algorithm, and a controller configured to generate a random number, perform hashing on the generated random number with a shared key using the hash-based message authentication code algorithm to obtain a hash value, and encrypt the obtained hash value to generate an advertising (ADV) signal.

The controller may be configured to periodically generate the random number, periodically generate the ADV signal in response to the periodic generation of the random number, and periodically transmit the generated ADV signal. The controller may also be configured to encrypt the obtained hash value using a previously stored encryption key. The previously stored encryption key may include information regarding a universal unique identification number (proximity Universal Unique ID (UUID)) field of a data field in a communication packet. The shared key may include information regarding a major field and a minor field of a data field in a communication packet.

The device may further include an inputter configured to receive a user input. In response to receiving a registration command of the terminal for performing a digital key function via the inputter as the user input, the controller may be configured to execute communication with the terminal. Additionally, in response to completion of the registration of the terminal connected with the communication, the controller may be configured to transmit information regarding a data field in a communication packet to the terminal, and permit identification information of the terminal, for which the registration is completed, to be stored in the storage.

The controller, in response to receiving information from the terminal for which registration is completed while in connection with the terminal by the communication, may be configured to execute an operation of at least one load based on the received information. The controller may also be configured to encrypt the obtained hash value in an advanced encryption standard (AES)128 encryption scheme having a length of 128 bits.

Additionally, the present disclosure provides a terminal that may include a communicator configured to communicate with a device, and a storage configured to store a hash-based message authentication code algorithm. The terminal may further include a controller configured to, in response to receiving an advertising (ADV) signal, decrypt the received ADV signal to obtain a random number and a first hash value, perform hashing on the obtained random number with a shared key using the hash-based message authentication code algorithm to obtain a second hash value, and permit a digital key function to be executed based on the first hash value and the second hash value.

The controller may be configured to, when identification information of the terminal is stored in the device, permit information regarding a universal unique identification number (proximity Universal Unique ID (UUID)) field, a major field, and a minor field of a data field in a communication packet transmitted from the device to be stored in the storage. The controller may be configured to, when decrypting the received ADV signal, decrypt the received ADV signal using the information regarding the universal unique identification number (proximity UUID) as an encryption key. The shared key may include the information of the major field and the information of the minor field.

Additionally, the controller may be configured to determine whether the first hash value is identical to the second hash value, and, when the first hash value is identical to the second hash value, determine that the device having transmitted the ADV signal is a previously registered device. When the first hash value is different from the second hash value, the controller may be configured to determine that the device having transmitted the ADV signal is not a previously registered device. The controller may be configured to transmit a communication connection signal to the device when the first hash value is identical to the second hash value. The hash-based message authentication code algorithm stored in the storage may be identical to a hash-based message authentication code algorithm stored in the device.

Additionally, the present disclosure provides a method of controlling a device performing communication with a terminal. The method may include generating a random number for attempting a communication connection with the terminal, performing hashing on the generated random number with a shared key using a hash-based message authentication code algorithm to obtain a hash value, and encrypting the obtained hash value to generated an advertising (ADV) signal. The method may further include, periodically transmitting the generated ADV signal, performing communication with the terminal in response to receiving a communication connection signal from the terminal, and executing an operation of at least one load based on information transmitted from the terminal. The periodical transmission of the ADV signal may include periodically generating the random number, periodically generating the ADV signal in response to the periodic generation of the random number, and periodically transmitting the ADV signal.

The encrypting of the obtained hash value may include obtaining information regarding a universal unique identification number (proximity Universal Unique ID (UUID)) field of a data field in a communication packet of the device as an encryption key, and encrypting the obtained hash value using the obtained encryption key. The shared key may include information of a major field and a minor field of a data field in a communication packet of the device.

The method may further include, in response to receiving a registration command of the terminal for performing a digital key function through an inputter as a user input, executing communication with the terminal; and in response to completion of the registration of the terminal connected with the communication, transmitting information regarding a data field in a communication packet to the terminal. The method may further include storing identification information of the terminal, for which the registration is completed, in a storage.

The encrypting of the obtained hash value may include encrypting the obtained hash value in an advanced encryption standard (AES)128 encryption scheme having a length of 128 bits. The hash-based message authentication code algorithm may be identical to a hash-based message authentication code algorithm stored in the terminal.

BRIEF DESCRIPTION OF THE DRAWINGS

These and/or other features of the disclosure will become apparent and more readily appreciated from the following description of the embodiments, taken in conjunction with the accompanying drawings of which.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

Like numerals refer to like elements throughout the specification. Not all elements of embodiments of the present disclosure will be described, and descriptions of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise. Reference numerals used for method steps are just used for convenience of explanation, but not to limit an order of the steps. Thus, unless the context clearly dictates otherwise, the written order may be practiced otherwise.

One device according to the present exemplary embodiment, when performing Bluetooth low energy (BLE) communication with another device, attempts communication with another device by periodically changing an advertising (ADV) signal, and transmitting the changed ADV signal to the other device. In particular, the one device (e.g., the first device) and the other device (e.g., the second device) may both be terminals. Alternatively, the first device may be a terminal and the second device may be a vehicle. Alternatively, the first device may be a vehicle and the second device may be a terminal. The present exemplary embodiment will be described with Bluetooth communication between a vehicle and a terminal as an example. Hereinafter, the operating principles and exemplary embodiments of the disclosure will be described with reference to the accompanying drawings.

Figure 1:
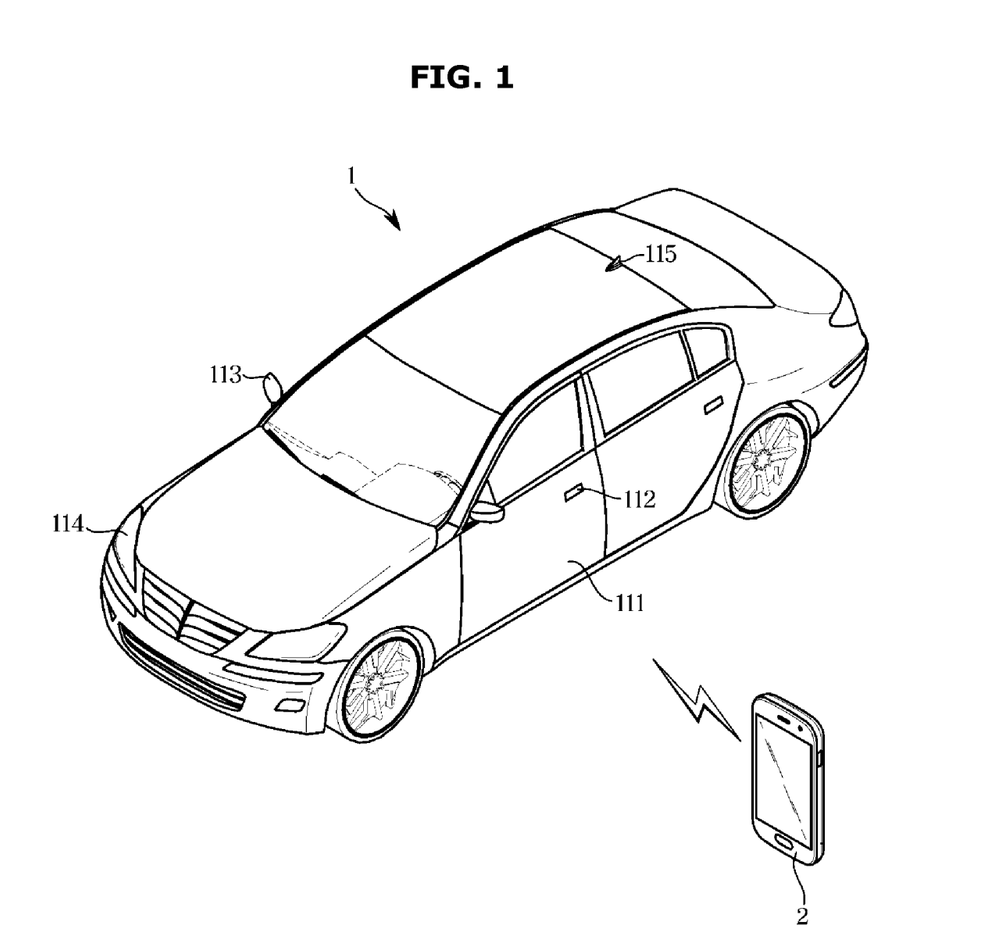
FIG. 1 is a view illustrating a vehicle and a terminal according to an exemplary embodiment of the present disclosure.

FIG. 1 is a view illustrating a vehicle 1 and a terminal 2 communicating with the vehicle 1 according to an exemplary embodiment. The vehicle 1 includes a body having an interior and an exterior and a chassis, which is a part of the vehicle 1 except for the body, on which mechanical devices required for traveling are installed.

Referring to FIG. 1, the exterior 110 of the vehicle 1 includes a front panel, a bonnet, a roof panel, a rear panel, a trunk in which luggage is disposed, front, rear, left, and right doors 111, and a window glass provided at each of the front, rear, left, and right doors to be openable and closable. The doors 111 at the front, rear, left, and right sides of the vehicle 1 may have a handle 112 that may be gripped by a user to open and close the door. The handle 112 may have a shape that protrudes outward from the surface of the door 111. In addition, the handle 112 may be provided to be pulled into or out of the door 111.

The exterior of the body includes a side mirror 113 that provides the driver with a rear view of the vehicle 1 and a plurality of lamps 114 that permits the driver to easily identify information regarding the surroundings of the vehicle 1 while maintaining a forward view. The side mirror 113 may perform an unfolding or folding operation in response to an ignition on/off operation.

At least one of the plurality of lamps 114 may perform lighting or flicking operation in response to receiving a door locking and unlocking command through the terminal 2. The plurality of lamps 114 may perform a lighting function and signaling and communication functions for other vehicles and pedestrians. The vehicle 1 may further include an antenna 115 for communicating with the terminal 2 and an external device. The antenna 115 may be mounted on a roof panel, a rear windshield glass, or the door, or may be provided on any one of the front panel and the rear panel.

The interior of the body includes a seat on which an occupant sits, a dashboard, a cluster (an instrument panel) located on the dashboard and providing guidance on driving functions and vehicle information, such as vehicle speed, engine revolution per minute (RPM), fuel amount, coolant, and the like, and a center fascia having a throttle of an air conditioner. The seat is a chair on which the occupant may sit, and may include a driver's seat on which a driver may sit, a passenger seat provided next to the driver's seat and on which a passenger may sit, and a rear seat provided in the rear of the driver's seat and the passenger seat and on which a passenger may sit.

The vehicle may include a head unit disposed in the center fascia and configured to operate an audio device, an air conditioner, a Bluetooth device, and a heating wire of a seat. The center fascia or the head unit may have a first inputter (121 of FIG. 2) for receiving a user input, and a display configured to display operation information of at least one of the functions performed in the vehicle (122 in FIG. 2).

The inputter (121 in FIG. 2) may include a hardware device, such as various buttons or switches, a pedal, a keyboard, a mouse, a trackball, various levers, handles or sticks, and the like. In addition, the inputter (121 in FIG. 2) may include a graphical user interface (GUI), such as a touch pad, in other words, a software device. The touch pad may be implemented as a touch screen panel (TSP) to form a mutual layer structure together with a display.

The interior of the body may include a key slot into which a fob type or card type remote controller (not shown) may be inserted. The key slot may be provided in the dashboard or the center fascia, to be adjacent to the driver's seat. The vehicle may be configured to transmit and receive information to and from the remote controller or the terminal 2 when the remote controller is inserted into the key slot or when authentication with the remote controller or the terminal 2 is completed via a wireless communication network. The interior of the body may further include a starter button for receiving an ignition on/off command. Accordingly, the vehicle turns on the ignition when the starter button is pressed by the user after authentication with the remote controller or the terminal 2 is completed.

The vehicle may further include a first communicator (140 of FIG. 2) configured to transmit and receive information to and from at least one of the electronic device provided in the vehicle, the remote controller, and the terminal 2. The first communicator (140 of FIG. 2) may include one or more components that enable communication between vehicle internal components, and may include, for example, at least one of a short-range communication module, a wired communication module, and a wireless communication module.

The short-range communication module may include various short-range communication modules configured to transmit and receive signals using a wireless communication network in a short range, such as a Bluetooth module, an infrared communication module, a radio frequency identification (RFID) communication module, a wireless local access network (WLAN) communication module, a near field communication (NFC) module, and a Zigbee communication module. The wired communication module may include various wired communication modules, such as a controller area network (CAN) communication module, a local area network (LAN) module, a wide area network (WAN) module, or a value added network (VAN) communication module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The wired communication module may further include local interconnect network (LIN). The wireless communication module may include wireless communication modules supporting various wireless communication methods, such as a Wi-fi module, a wireless broadband module (Wibro) module, a global system for mobile (GSM) communication module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The terminal 2 may be configured to communicate with the vehicle, and receive at least one of a lock and unlock command of the door 111, a lock and unlock command of the tail gate, an ignition command, a lighting command of the lamp 114, and an ignition command as a user input, and transmit information that corresponds to the received command to the vehicle 1. The terminal 2 may be configured to transmit the information that corresponds to the received command to the vehicle as a communication signal.

The terminal 2 may be implemented as a computer or a portable terminal which may be communicatively connected to the vehicle 1 via a network. In particular, the computer may include, for example, a notebook computer, a desktop computer, a laptop personal computer (PC), a tablet PC, a slate PC, and the like, each of which is equipped with a web browser. The portable terminal is a wireless communication device ensuring portability and mobility, and may include: all types of handheld based wireless communication devices, such as a personal communication system (PCS), a GSM communications, a personal digital cellular (PDC), a personal handy phone system (PHS), a personal digital assistant (PDA), an international mobile telecommunication (IMT)-2000 system, a code division multiple access (CDMA)-2000 system, a w-code division multiple access (W-CDMA) system, a wireless broadband internet (WiBro) terminal, a smart Phone, and the like; and wearable devices, such as a watch, a ring, a bracelet, an ankle bracelet, a necklace, glasses, a contact lens, or a head-mounted-device (HMD).

The terminal 2 according to the present exemplary embodiment may be configured to communicate with the vehicle via a Bluetooth low energy (BLE) communication scheme. The terminal 2 may be configured to perform communication by a Bluetooth beacon standard (iBeacon).

Figure 2:
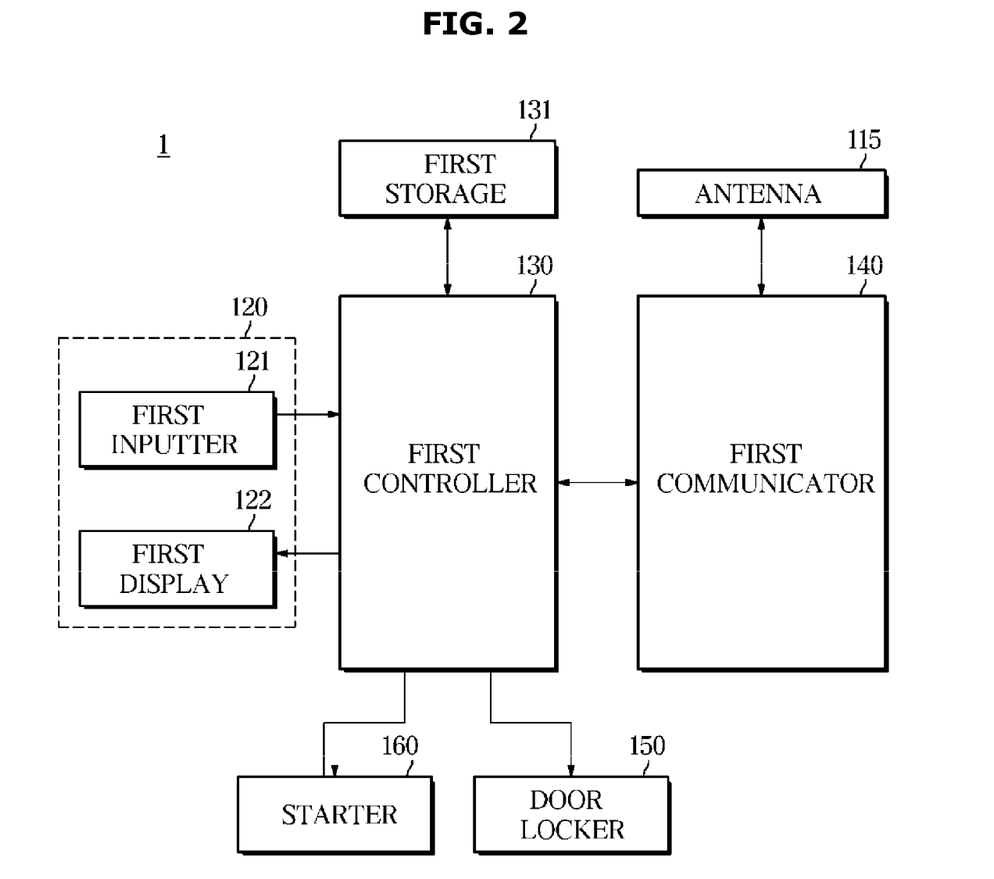
FIG. 2 is a control block diagram illustrating a vehicle according to an exemplary embodiment of the present disclosure.

FIG. 2 is a control block diagram illustrating the vehicle 1 according to the exemplary embodiment. To distinguish components of the vehicle 1 that are denoted with the same names as components of the terminal 2, the components of the vehicle 1 are denoted using a term "first", and the components of the terminal 2 are denoted using a term "second".

The vehicle 1 may include a first inputter 121, a first display 122, a first controller 130, a first storage 131, a first communicator 140, a door locker 150, and a starter 160. The first inputter 121 may be configured to receive an operation command of various functions that may be performed in the vehicle 1. The first inputter 121 may be configured to receive a lock and unlock command of the door and a registration command of the terminal 2. The first inputter 121 may also be configured to receive identification information of the terminal 2 and registration authentication information, which has been transmitted to the terminal 2 at a time of registration of the terminal 2, from the user. In particular, the terminal 2 registered in the vehicle may operate as a digital key of the vehicle, in other words, a remote controller. The first inputter 121 may include a starter button for receiving an ignition on command for starting the engine or driving the motor from the user and receiving an ignition off command from the user when the vehicle is stopped.

The first display 122 may be configured to display information regarding a function performed in the vehicle and information input by the user. In addition, the first display 122 may be configured to display information regarding a registration process of the terminal and displays registration success information or registration failure information of the terminal in response to the result of the registration. The first display 122 may be configured to display identification information of a terminal for which registration is completed. Further, the first display 122, at a time of an attempt to communicate with the terminal 2, may be configured to display information regarding an authentication process of the terminal 2 and authentication success or authentication failure information of the terminal 2 that corresponds to the result of the authentication. The first display 122 may be configured to display identification information of a terminal for which authentication is successful.

The first inputter 121 and the first display 122 may be implemented as a touch screen. The first inputter 121 and the first display 122 may be provided as an inputter and a display of a vehicle terminal 120. The vehicle terminal 120 may refer to a terminal that performs audio, video, and navigation (AVN) functions.

The first controller 130, in response to receiving a registration command for terminal registration, may be configured to search for a terminal that may perform communication, and transmit registration authentication information for authentication to the detected terminal, and in response to receiving registration authentication information through the first inputter, compare the received registration authentication information with the transmitted registration authentication information. When the received registration authentication information is identical to the transmitted registration authentication information, the first controller 130 may be configured to register the detected terminal as a terminal for performing a function of a digital key. In addition, when a plurality of terminals are detected, the first controller 130 may be configured to transmit different pieces of registration authentication information to the plurality of terminals, and in response to receiving one of the pieces of registration authentication information through the first inputter 121, identify registration authentication information that is identical to the received authentication information, and register a terminal that is matched with the identified registration authentication information as a terminal for performing a function of a digital key.

In the searching for the terminal, the first controller 130 may be configured to identify signal reception strength information of signals received by the first communicator 140 and terminal identification information, and based on the received signal reception strength information and reference signal reception strength information, identify reception signal strength information greater than or equal to the reference signal reception strength among the received signal reception strengths, and search for a terminal that matches with the identified reception signal strength information. In other words, the first controller 130 may be configured to search for a terminal existing in a range within a reference distance.

Additionally, the first controller 130 may be configured to permit identification information of a terminal, which has transmitted the received registration authentication information, to be stored in the first storage 131, and operate the first display 122 to display the identification information of the registered terminal 2. In the registering of the terminal for performing a function of a digital key, the first controller 130 may be configured to transmit a beacon packet for authentication of the terminal 2 and communication connection with the terminal 2 to the terminal 2.

Figure 3:
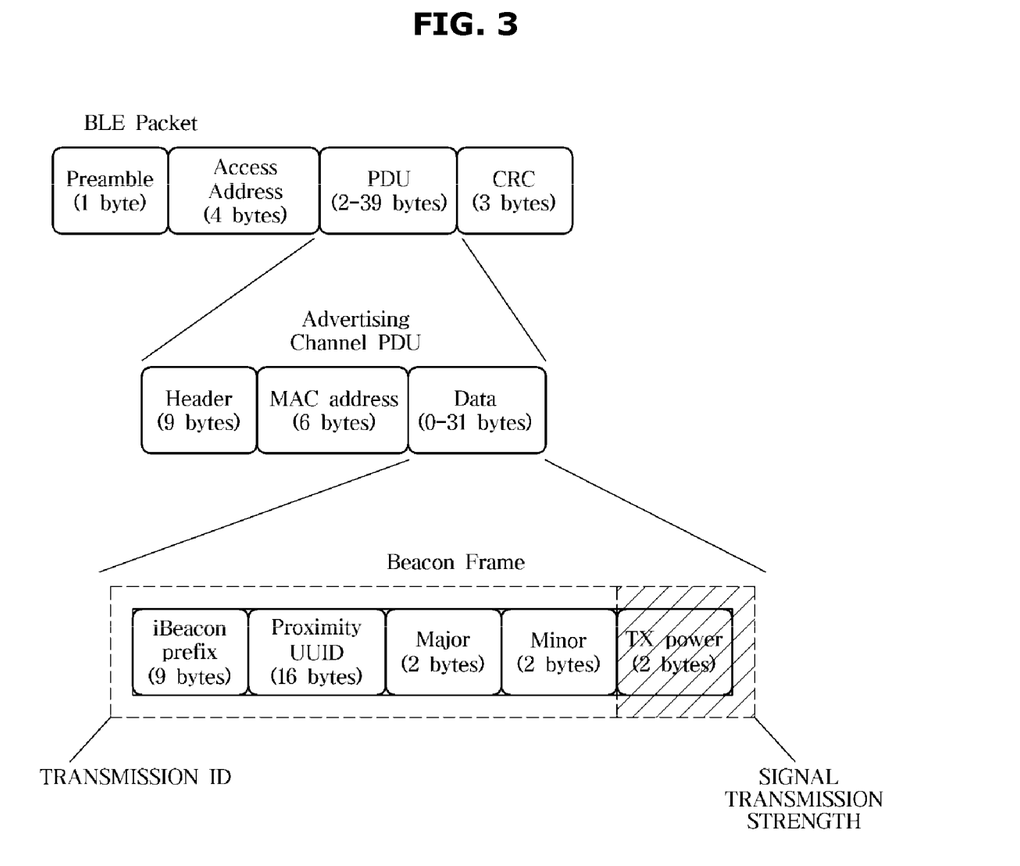
FIG. 3 is a view illustrating a structure of a beacon packet of a vehicle according to an exemplary embodiment of the present disclosure.

Referring to FIG. 3, the beacon packet may include a preamble field for synchronizing transmission timing between two or more devices, an access address field having an address for communication connection in a link layer, a protocol data unit (PDU) field having information regarding the total amount of data transmitted and received with the same communication layers, and a cyclic redundancy check (CRC) field including a method of determining a check value for identifying an existence of an error in data transmitted during data transmission. The following description will be made in relation to an advertising data standard for broadcasting according to the iBeacon specification as an example.

The PDU field is an advertising channel protocol data unit field, and may include a header field included before a data set and identifying and controlling data to ensure that content and characteristics of the data are identified, a Mac Address field including a unique number existing in a device used in a network, such as a LAN card, a modem, a terminal, and the like, and a data field. The data field may include a prefix (iBeacon prefix), a universal unique identification number (Proximity Universal Unique (UUID)) field, a major field, a minor field, and a transmit (TX) power field.

In particular, the prefix (iBeacon prefix) field is a portion in which a setting or characteristic value of a beacon is recorded, and may include an advertising flag, an advertising header, company identification (ID) information, and a beacon length (Length). The prefix (iBeacon prefix) field is a field that indicates whether the vehicle is a vehicle using a beacon protocol. The universal unique identification number (UUID) field contains a unique identification (ID) information of a device or a product. The universal unique identification number (Proximity UUID) field is a field used to prove identification information of a vehicle, together with a company name of the vehicle.

The major field may include identification information (ID) of a service group or region. For example, the major field is a field used to identify a broad location where the vehicle is used. Identification (ID) information of the minor field may include information for identifying nodes within the same region. For example, the minor field is a field used to identify a narrow location where the vehicle is used and an individual vehicle. The TX Power field may include a power level of a signal transmitted from the vehicle.

Accordingly, when the terminal receives the beacon signal, the terminal may be configured to identify the signal strength. In other words, the terminal may be configured to compare the transmission signal strength that corresponds to the power level with a received signal strength, to obtain the amount of decrease of strength and obtain the distance to the vehicle based on the amount of the decrease.

Figure 4:
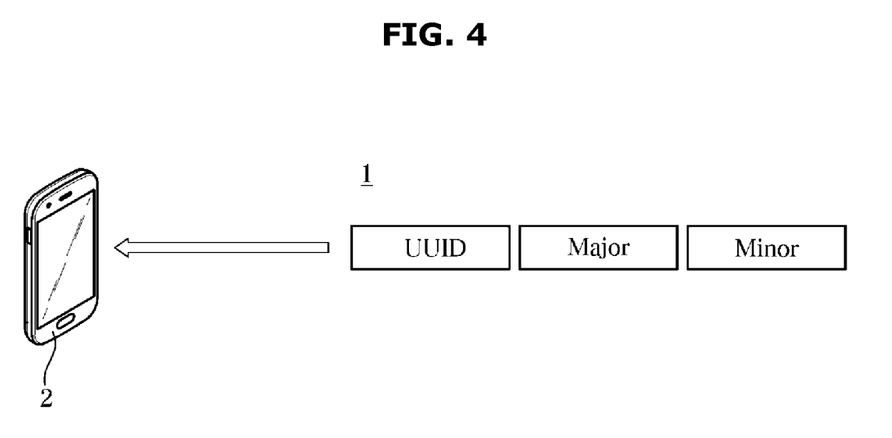
FIG. 4 is a view illustrating a data field transmitted from a vehicle to a terminal according to an exemplary embodiment of the present disclosure.

Referring to FIG. 4, the first controller 130, in response to completion of the registration of the terminal 2, may be configured to transmit information regarding a proximity UUID field, a major field, and a minor field of data included in a beacon packet to the terminal 2 as information for communication connection with the terminal for which registration is completed. When the first controller 130 attempts to communicate with the terminal 2 for performing a key of a digital key, the first controller 130 may be configured to transmit a beacon packet.

When the first controller 130 attempts to communicate with the terminal 2, the first controller 130 may be configured to periodically transmit an advertising (ADV) signal in a broadcasting manner. When the first controller 130 periodically transmits ADV data, the first controller 130 may be configured to randomly generate a number (hereinafter, referred to as a random number) at a predetermined time interval, regenerate the ADV signal using the generated random number, and transmit the regenerated ADV signal to the terminal 2.

The first controller 130 may be configured to perform hashing on the random number using a shared key, and obtain a hash value as a result of the hashing. In particular, the shared key is a key to be used for the hashing and a key shared with the terminal. The shared key may include ID information of the major field and ID information of the minor field.

In other words, the first controller 130 may be configured to obtain a hash value by performing hashing on a random number with a shared key using a hash-based message authentication code algorithm, and encrypt the obtained hash value and the random number to generate a hash-based message authentication code (HMAC). In particular, the hash-based message authentication code algorithm is an algorithm that prevents forgery of a message using a hashing technique.

When performing the encryption, the first controller 130 may be configured to perform encryption using the universal unique identification number (UUID) as an encryption key, and transmit the encrypted HMAC to the terminal 2 as an ADV signal. The first controller 130 may be configured to perform the encryption using an advanced encryption standard 128 (AES128) having a key length of 128 bits among advanced encryption standard technologies. The encryption may be performed in hardware of a link layer in a protocol stack structure of the beacon packet. Accordingly, the first controller 130 may be configured to generate the random number at predetermined time intervals, periodically generate the HMAC in response to the generation of the random number, and periodically transmit the generated HMAC. In particular, the period may refer to a predetermined period of time.

The first controller 130, in response to receiving a communication connection signal from the terminal 2 upon success of a communication connection attempt of the terminal 2, may be configured to communicate with the terminal 2, receive information transmitted from the terminal 2, and execute the operation of at least one load based on a control command included in the received information to allow a function that corresponds to the received information is performed. For example, the first controller 130, in response to receiving a door opening command from the terminal 2 connected with communication, may be configured to execute the unlocking of the door, and in response to receiving a door closing command from the terminal 2 connected with communication, execute the locking of the door, and in response to receiving a lighting command of the lamp from the terminal connected with communication, operate the lighting of the lamp.

The first controller 130, in response to receiving an ignition-on command from the terminal 2 connected with communication, may be configured to start the engine, and in response to receiving an ignition-on command through a starter button while connected to the terminal 2 by communication, start the engine. When the handle of the door is automatically pulled into or out of the door, the first controller 130 in response to receiving a door opening command from the terminal 2 connected with communication may be configured to unlock the door and operate the handle to be pulled out of the door. In response to receiving a door closing command from the terminal 2 connected with communication, the first controller 130 may be configured to lock the door and operate the handle to be pulled into the door (e.g., retract into the door).

The first controller 130, in response to receiving a connection signal from the terminal 2, may be configured to compare identification information of the registered terminal with identification information of the terminal connected with communication, and determine whether the terminal having transmitted the connection signal is a registered terminal. The first controller 130, in response to a determination that identification information of the registered terminal is identical to identification information of the terminal connected with communication, may be configured to operate at least one load to perform an operation that corresponds to information received from the terminal connected with communication. In addition, the first controller 130, in response to a determination that identification information of the registered terminal is identical to identification information of the terminal connected with communication, may be configured to reject or suspend operation control of at least one load that corresponds to information received from the terminal connected with communication.

The first controller 130, in response to receiving a communication connection signal from the terminal 2, may be configured to obtain distance information of the terminal based on the transmission power in the packet and reception signal strength of the signal transmitted from the terminal 2, determine whether the distance to the terminal is less than a reference distance based on the obtained distance information and reference distance information, and in response to determining that the distance to the terminal is less than the reference distance, operate at least one load based on information transmitted from the terminal. In response to determining that the distance to the terminal exceeds the reference distance, the first controller 130 may suspend or reject the operation of at least one load that corresponds to information transmitted from the terminal. The first controller 130, in response to failure to operate at least one load that corresponds to the information transmitted from the terminal 2, may be configured to transmit operation control failure information to the terminal 2, and in response to the distance from the terminal exceeding a reference distance, may be configured to transmit information regarding exceeding the reference distance.

The first controller 130 may be implemented by one processor. The first controller 130 may include a memory (not shown) configured to store data regarding an algorithm for executing the operations of the components of the vehicle or a program that represents the algorithm, and a processor (not shown) that performs the above described operations using the data stored in the memory. In particular, the memory and the processor may be implemented as separate chips. Alternatively, the memory and the processor may be implemented as a single chip. The first storage 131 stores the hash-based message authentication code algorithm, and stores the shared key and the encryption key. The first storage 131 stores the beacon packet. The first storage 131 stores the identification information of the terminal.

The first storage 131 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the first storage unit 131 is not limited thereto. The first storage unit 131 may be a memory implemented as a chip separated from the processor, which has been described above in connection with the first control 130, or may be implemented as a single chip integrated with the processor.

The first communicator 140 may be configured to communicate with the terminal 2 and perform Bluetooth communication with a terminal that performs a function of a smart key. The first communicator 140 may be configured to transmit a beacon packet to the terminal 2 in response to a control command of the first controller, and transmit an ADV signal to the terminal 2 in response to a control command of the first controller. The first communicator 140 may be configured to transmit information transmitted from the terminal 2 to the first controller 130.

The first communicator 140 may be configured to perform Bluetooth communication. In particular, the performing of the Bluetooth communication may include communicating with the terminal using at least one of a broadcasting method and a connection method. The broadcasting method is a communication method in which a communication connection is not established with a terminal and an ADV signal informing neighboring terminals of the presence of the vehicle is periodically transmitted. In the broadcasting method, the amount of data to be transmitted may be less than or equal to preset bytes. In other words, the broadcasting method is used when a small amount of data is periodically transmitted to a substantial number of terminals.

The connection method is used to perform two-way transmission or to transmit an amount of data that exceeds preset bytes. In the connection method, data is transmitted after the vehicle and the terminal are connected in one-to-one method, and the security is ensured when compared to the broadcasting method. In particular, the information transmitted from the terminal 2 includes command information for operating at least one of a plurality of loads provided in the vehicle.

The door locker 150 may be mounted in each of the plurality of doors, and may perform locking and unlocking on the at least one door 116 based on a command of the first controller 130. The starter 160 may include at least one of the motor and the engine for applying a driving force to vehicle wheels. In particular, the engine operates a starter motor based on a command of the first controller 130 at a time of ignition-on and stops the operation of the starter motor based on an ignition-off command of the first controller 130.

The vehicle may further include a lamp driver. In particular, the first controller 130 may be configured to operate the lamp driver to turn on the lamp when information that corresponds to a lamp lighting command is received from the terminal for which authentication is completed. At least one component may be added or omitted to correspond to the performances of the components of the vehicle shown in FIG. 2. In addition, the mutual positions of the components may be changed to correspond to the performance or structure of the system.

Figure 5:
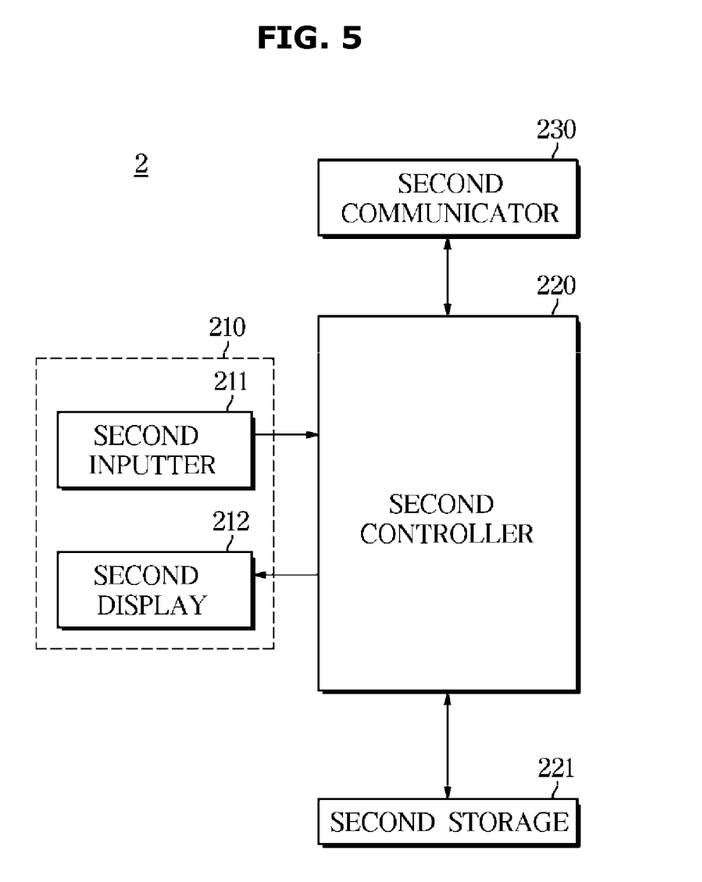
FIG. 5 is a control block diagram illustrating a terminal communicating with a vehicle according to an exemplary embodiment of the present disclosure.

FIG. 5 is a control block diagram illustrating a terminal 2 for communicating with the vehicle according to an exemplary embodiment. The terminal 2 may include a second inputter 211, a second display 212, a second controller 220, a second storage 221, and a second communicator 230.

In particular, the second inputter 211 may be configured to receive a user input. The second inputter 211 may be a digital key configured to receive a registration command and registration authentication information. Additionally, the second inputter 211 may be configured to receive a control command for operating the vehicle. The second inputter 211 may be configured to receive at least one of a communication connection attempt command with the vehicle, a door lock command, a door unlock command, a tail gate lock command, a tail gate unlock command, a start command, and a lamp lighting command. The inputter 211 may be provided as a button type inputter to be pressed or otherwise manipulated by the user or a touch type inputter to be touched by the user.

The second display 212 may be configured to display input information input to the second inputter 211 and display information regarding a registration process. Additionally, the second display 212 may be configured to display communication connection success information or communication connection failure information based on a command of the second controller 220. The second display 212 may be configured to display a plurality of buttons having control commands that may be transmitted to the vehicle when communication connection with the vehicle is established. For example, the second display 212 may be configured to display operation performance information that corresponds to the control command transmitted to the vehicle. For example, the second controller 212 may be configured to display door lock completion or failure information that corresponds to a door lock command, display door unlock completion or failure information that corresponds to a door unlock command, display lamp lighting completion or failure information that corresponds to a lighting command transmitted to the vehicle, or display the time remaining until the lamp is turned In particular, the second inputter 211 may include a touch panel, and the second display 122 may include a display panel, and the touch panel of the second inputter 211 and the display panel of the second display 212 may be integrally formed with each other. In other words, the touch panel of the second inputter 211 and the display panel of the second display 212 may be implemented as a touch screen 210. The second controller 220 may be configured to activate the second communicator 230 based on a registration command input through the second inputter 211, and may be configured to transmit a registration agreement command to the vehicle through the second inputter 211. The second controller 220 may be configured to transmit registration authentication information input through the second inputter 211 to the vehicle.

The second controller 220, in response to receiving a beacon packet from the vehicle in the registration of the terminal in the vehicle, may be configured to permit information regarding a universal unique identification number (Proximity UUID) field, a major field, and a minor field included in data in the received beacon packet to be stored in the second storage 221. Alternatively, the second controller 220 may be configured to receive information regarding a Proximity UUID field, a major field, and a minor field included in data in a beacon packet from the vehicle when the registration of the terminal in the vehicle is completed, and permit the received information to be stored in the second storage.

Further, the second controller 220 may be configured to obtain a shared key and an encryption key based on the received information regarding the field, the Major field, and the Minor field, and operate the second storage 221 to store the obtained shared key and the encryption key therein. The second controller 220 may be configured to parse a packet in the registration of the terminal in the vehicle, and when the packet is determined to be a beacon packet, operate the second display to display information regarding a Proximity UUID field, a Major field, and a Minor field in a data field in the beacon packet thereon.

The second controller 220 may be configured to operate the second storage to store identification information of the vehicle when terminal registration completion information is received from the vehicle. In other words, the terminal may be configured to store the vehicle having transmitted the beacon packet as a vehicle to be operated through the function of a digital key.

The second controller 220 may be configured, when a digital key function is performed after the completion of the terminal registration, to attempt a communication connection with the vehicle by activating the second communicator. In the attempt to perform communication connection with the vehicle, the second controller 220 may be configured to perform ADV signal scanning.

In the scanning of the ADV signals, the second controller 220 in response to receiving an ADV signal transmitted from a vehicle within a predetermined distance, may be configured to determine that a vehicle is present within the predetermined distance, and attempt to establish a communication connection with the vehicle. Alternatively, the second controller 220, in response to receiving an ADV signal, may be configured to obtain distance information from the vehicle based on reception signal strength of the received signal, and may be configured to determine whether the distance from the vehicle is within a certain distance based on the obtained distance information and reference distance information.

Additionally, the second controller 220, in response to receiving the ADV signal, may be configured to initialize the communication connection again and permit communication with the vehicle to be performed through the connection method. The second controller 220, in response to receiving the ADV signal, may be configured to set timing and periodically exchange data based on the set timing.

The second controller 220, in response to receiving the ADV signal, may be configured to determine whether the vehicle that has transmitted the ADV signal is a vehicle to be controlled by the digital key function based on the received ADV signal. The second controller 220, in response to receiving the ADV signal, may be configured to identify the UUID of the data field in the beacon packet stored in the second storage 221, and decrypt the received ADV signal using the identified UUID as an encryption key to obtain data. The obtained data is a hash-based message authentication code (HMAC), and may include a hash value and a random number.

The second controller 220 may be configured to obtain the random number and the hash value (hereinafter, referred to as a first hash value) by separating the random number and the hash value from the decrypted data. The second controller 220 may be configured to perform hashing on the random number, which is obtained by decryption, using the shared key stored in the second storage 221 and obtain a hash value (hereinafter, referred to as a second hash value) as a result of the hashing. In other words, the second controller 220 may be configured to obtain the second hash value by performing hashing on the random number with the shared key using a hash-based message authentication code algorithm. In particular, the hash-based message authentication code algorithm is the same as a hash-based message authentication code algorithm having been used to obtain a hash value in the vehicle.

Further, the second controller 220 may be configured to compare the first hash value with the second hash value to determine whether the first hash value and the second hash value are the same; when the first hash value and the second hash value are the same, the second controller 220 may be configured to determine that the vehicle having transmitted the ADV signal is a vehicle to be operated through the digital key function, and when the first hash value and the second hash value are different from each other, determine that the vehicle having transmitted the ADV signal is not a vehicle to be operated through the digital key function. The second controller 220, in response to determining that the vehicle transmitting the ADV signal is a vehicle to be controlled through the digital key function, may be configured to connect to the vehicle through communication and operate the second display to display communication connection information with the vehicle, and operate the second communicator 230 to transmit information that corresponds to a user input received through the second inputter 211 to the vehicle 1.

The second controller 220 may be configured to operate the second display 212 to display communication connection failure information when the communication connection with the vehicle 1 fails. The second controller 220 may be configured to perform authentication for confirming whether the vehicle to be operated is a registered vehicle by analyzing the scanned ADV signal before the performance of the function of the digital key.

The second storage 221 may be configured to store a hash-based message authentication code algorithm identical to the algorithm stored in the vehicle and store information regarding a universal unique identification number (Proximity UUID) field, a major field, and a minor field included in a data field in a beacon packet stored in a vehicle. In particular, the information relating to the beacon packet is information for confirming whether the vehicle attempting the communication connection is a vehicle registered in the terminal, at a time of attempt to communicate with the vehicle and the terminal after the terminal registration. In addition, the information relating to the beacon packet may be used as information for confirming whether the terminal attempting the communication connection is a registered terminal, at a time of attempt to communicate with the vehicle and the terminal after the terminal registration.

The second storage 221 may be configured to store the shared key and the encryption key and the identification information of the vehicle. The second communicator 230 may be configured to perform communication with the vehicle and transmit information that corresponds to a user input that is input to the second inputter 211 to the vehicle in response to a control command of the second controller 220. The second communicator 230 may be configured to transmit information transmitted from the vehicle to the second controller 220.

The terminal may further include a power supply unit supplying power for driving various components to the components. The power supply unit may include a rechargeable battery. At least one component may be added or omitted according to the performances of the components of the terminal 2 shown in FIG. 5. In addition, the mutual positions of the components may be changed to correspond to the performance or structure of the system.

Figure 6:
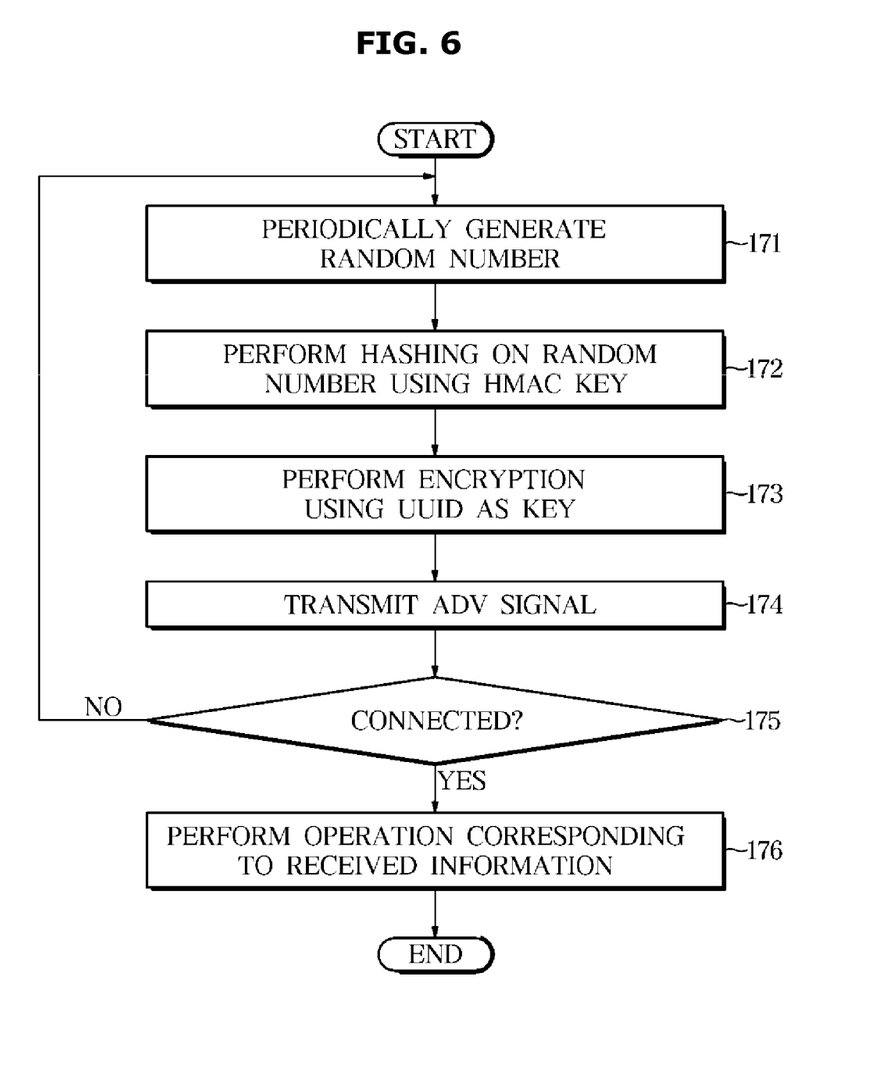
FIG. 6 is a control flowchart of a vehicle according to an exemplary embodiment of the present disclosure.

FIG. 6 is a control flowchart of a vehicle according to an exemplary embodiment. One or more steps of the methods described herein may be executed by a controller. The vehicle may be configured to register and store identification information of a terminal for performing a function of a digital key, and attempt communication with the terminal to determine whether information is received from the terminal when the vehicle is in a parked or stopped state.

The determining of whether the vehicle is in the parking state or the stopping state may include at least one of determining whether the ignition is at an off state, determining whether the traveling speed is zero, and determining whether the shift lever is positioned at a parking stage. In the attempt to communicate with the terminal, the vehicle may be configured to randomly generate a random number (hereinafter, a random number) at a predetermined time interval (171), obtain a hash value by performing hashing on the random number with a shared key using a hash-based message authentication code algorithm (172), and generate an HMAC by encrypting the obtained hash value and the random number (173). In particular, the shared key is a key to be used for the hashing and may be a key shared with the terminal. The shared key may include ID information of a major field and ID information of a minor field.

The encrypting of the obtained hash value and the random number may include encrypting the obtained hash value and the random number using a UUID as an encryption key. The encrypting of the obtained hash value and the random number may include encrypting the obtained hash value and the random number using an AES128 scheme in which a key length is 128 bits. The vehicle may be configured to transmit the encrypted HMAC to the terminal 2 as an ADV signal (174).

Accordingly, the vehicle may be configured to generate the random number at a predetermined time interval, periodically generate the HMAC in response to the generation of the random number, and periodically transmit the generated HMAC. In particular, the period may be a certain period of time. In other words, the vehicle may be configured to periodically transmit the ADV signal in a broadcasting manner.

The vehicle may be configured to determine whether the vehicle is connected to the terminal through communication (175), and in response to determining that the vehicle is connected to the terminal, perform an operation that corresponds to information received from the connected terminal (176). In other words, the vehicle, in response to receiving a communication connection signal from the terminal 2 upon success of a communication connection attempt, may be configured to perform communication with the terminal 2, and in response to receiving information transmitted from the terminal 2, operate at least one load based on a control command included in the received information, and the function that corresponds to the received information may be performed.

In addition, the vehicle, in response to receiving the information from the terminal while in connection with the terminal by communication, may be configured to determine whether the terminal having transmitted the information is a registered terminal based on the received information. In particular, the vehicle, in response to a determination that the terminal having transmitted the information is a registered terminal, may be configured to operate the at least one function based on the information transmitted from the terminal.

For example, the vehicle 1, in response to receiving a door opening command from the terminal 2 connected by communication, may be configured to unlock the door, and in response to receiving a door closing command from the terminal 2 connected by communication, lock the door, and in response to receiving a lighting command of the lamp from the terminal 2 connected by communication, operate the lamp. In addition, the vehicle, in response to receiving an ignition on command from the terminal 2 connected with communication may be configured to start the engine, and in response to receiving an ignition on command through a starter button while connected to the terminal through communication, start the engine.

Figure 7:
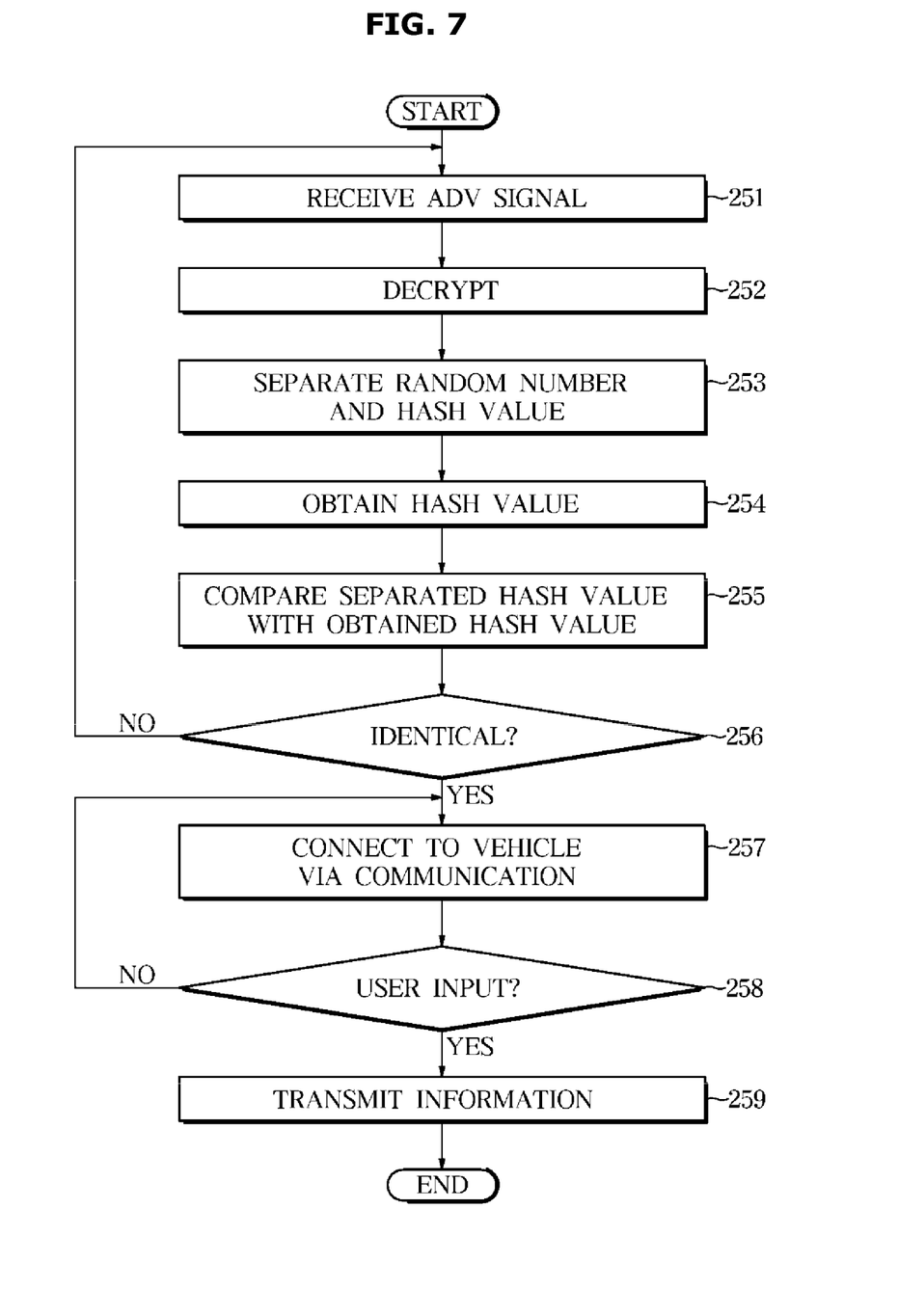
FIG. 7 is a control flowchart of a terminal communicating with a vehicle according to an exemplary embodiment of the present disclosure.

FIG. 7 is a control flowchart of a terminal communicating with a vehicle according to an exemplary embodiment. One or more steps of the methods described herein may be executed by a controller. The terminal is a terminal for performing a function of a digital key, and is configured to, in response to receiving a selection signal of an application for performing the function of the digital key from a user while having identification information of a vehicle registered therein, perform the function of the digital key in response to execution of the selected application. In particular, the terminal may be configured to display an image of the function of the digital key through the second display.

The terminal may be configured to determine whether an ADV signal is received by performing ADV signal scanning. The terminal, in response to receiving the ADV signal (251), may be configured to identify a shared key stored in the second storage 221. The identifying of the shared key may include identifying a UUID of a data field in a beacon packet. The terminal may be configured to decrypt the received ADV signal using the identified UUID as an encryption key to obtain data (252). The obtained data is an HMAC, and may include a hash value and a random number.

In other words, the terminal may be configured to obtain a random number and a hash value (hereinafter, referred to as a first hash value) by separating the random number and the hash value from the decrypted data (253). The terminal may be configured to perform hashing on the random number obtained through the decryption using the shared key stored in the second storage 221 and obtain a hash value (hereinafter, referred to as a second hash value) as a result of the hashing (254). In particular, the terminal obtains the second hash value by performing hashing on the random number with the shared key using a hash-based message authentication code algorithm. Even more particularly, the hash-based message authentication code algorithm is the same algorithm as a hash-based message authentication code algorithm having been used to obtain the hash value in the vehicle.

Further, the terminal may be configured to compare the first hash value with the second hash value (255) and determine whether the first hash value and the second hash value are the same (256). The terminal, in response to determining that the first hash value and the second hash value are different from each other, may be configured to determine that the vehicle having transmitted the ADV signal is not a vehicle to be operated by the digital key function.

The terminal, in response to determining that the first hash value and the second hash value are the same, may be configured to determine that the vehicle having transmitted the ADV signal is the vehicle to be operated by the digital key function, and then connect to the vehicle via communication (257), and transmit communication connection information to the vehicle connected with communication. In addition, the terminal may be configured to display the communication connection information with respect to the vehicle through the second display.

Accordingly, the terminal may be configured to perform authentication for confirming whether the vehicle to be operated is a registered vehicle by analyzing the scanned ADV signal before the performance of the function of the digital key. The terminal be configured to determine whether a user input is input through the second inputter (258), and in response to determining that the user input is input, transmit information that corresponds to the user input to the vehicle 1 (259).

For example, the terminal, in response to receiving a door closing command as the user input, may be configured to transmit information regarding the received door locking command to the vehicle, and the terminal, in response to receiving information regarding the door locking from the vehicle, may display the information regarding the door lock through the second display. As is apparent from the above, an ADV signal of Bluetooth communication may be periodically changed in a random manner, a communication with a terminal may be attempted, and an inadvertent transmission of personal information and vehicle information may be prevented.

In addition, the security of the communication and the authentication function with the vehicle and the terminal may be improved with the existing configuration without changing logic of the communication and authentication with the terminal and the vehicle or adding configurations. Performance of door opening and starting of the vehicle by another device may be prevented. Accordingly, the security of the vehicle may be improved while preventing theft of the vehicle by others. Therefore, the security of communication with the terminal may be improved, thereby improving the quality and the marketability of the vehicle, and further improving the convenience and safety of the vehicle and securing the competitiveness of the product.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:
1. A device, comprising:
an inputter configured to receive a user input;
a storage storing a hash-based message authentication code algorithm; and
a controller configured to:
generate a random number,
perform hashing on the generated random number with a shared key using the hash-based message authentication code algorithm to obtain a hash value, and
encrypt the obtained hash value to generate an advertising (ADV) signal,
wherein the controller is configured to:

in response to receiving a registration command of the terminal for performing a digital key function via the inputter as the user input, execute communication with the terminal; and in response to completion of the registration of the terminal connected with the communication, transmit information regarding a data field in a communication packet to the terminal, and permit identification information of the terminal, for which the registration is completed, to be stored in the storage.

2. The device of claim 1, wherein the controller is configured to periodically generate the random number, periodically generate the ADV signal in response to the periodic generation of the random number, and periodically transmit the generated ADV signal.

3. The device of claim 1, wherein the controller is configured to encrypt the obtained hash value using a previously stored encryption key.

4. The device of claim 3, wherein the previously stored encryption key includes information regarding a universal unique identification number field of a data field in a communication packet.

5. The device of claim 1, wherein the shared key includes information regarding a major field and a minor field of a data field in a communication packet.

6. The device of claim 1, wherein the controller is configured, in response to receiving information from the terminal for which registration is completed while in connection with the terminal by the communication, to operate at least one load based on the received information.

7. The device of claim 1, wherein the controller is configured to encrypt the obtained hash value in an advanced encryption standard 128 encryption scheme having a length of 128 bits.

8. A terminal, comprising:
an inputter configured to receive a user input,
a communicator configured to communicate with a device;
a storage configured to store a hash-based message authentication code algorithm; and
a controller configured to, in response to receiving an advertising (ADV) signal, decrypt the received ADV signal to obtain a random number and a first hash value, perform hashing on the obtained random number with a shared key using the hash-based message authentication code algorithm to obtain a second hash value, and
permit a digital key function to be executed based on the first hash value and the second hash value,
wherein the controller is configured to:
in response to receiving a registration command of the terminal for performing a digital key function via the inputter as the user input, execute communication with the device; and
in response to completion of the registration of the terminal connected with the communication, receive information regarding a data field in a communication packet from the device, and permit identification information of the device, for which the registration is completed, to be stored in the storage.

9. The terminal of claim 8, wherein the controller, when identification information of the terminal is stored in the device, is configured to permit information regarding a universal unique identification number field, a major field, and a minor field of a data field in a communication packet transmitted from the device to be stored in the storage.

10. The terminal of claim 9, wherein the controller is configured, when decrypting the received ADV signal, to decrypt the received ADV signal using the information regarding the universal unique identification number as an encryption key.

11. The terminal of claim 9, wherein the shared key includes the information of the major field and the information of the minor field.

12. The terminal of claim 8, wherein the controller is configured to determine whether the first hash value is identical to the second hash value, and, when the first hash value is identical to the second hash value, determine that the device having transmitted the ADV signal is a previously registered device, and, when the first hash value is different from the second hash value, determine that the device having transmitted the ADV signal is not a previously registered device.

13. The terminal of claim 12, wherein the controller is configured to transmit a communication connection signal to the device when the first hash value is identical to the second hash value.

14. The terminal of claim 8, wherein the hash-based message authentication code algorithm stored in the storage is identical to a hash-based message authentication code algorithm stored in the device.

15. A method of controlling a device performing communication with a terminal, the method comprising:
generating, by a controller, a random number for attempting a communication connection with the terminal;
performing, by the controller, hashing on the generated random number with a shared key using a hash-based message authentication code algorithm to obtain a hash value;
encrypting, by the controller, the obtained hash value to generated an advertising (ADV) signal;
periodically transmitting, by the controller, the generated ADV signal;
performing, by the controller, communication with the terminal in response to receiving a communication connection signal from the terminal; and
operating, by the controller, at least one load based on information transmitted from the terminal,
wherein the periodical transmission of the ADV signal includes periodically generating the random number, periodically generating the ADV signal in response to the periodic generation of the random number, and periodically transmitting the ADV signal, further comprising: in response to receiving a registration command of the terminal for performing a digital key function through an inputter as a user input, executing, by the contoller communication with the terminal; and
in response to completion of the registration of the terminal connected with the communicate, transmitting, by the controller, information regarding a data field in a communication packet to the terminal; and
storing, by the controller, identification information of the terminal, for which the registration is completed, in a storage.

16. The method of claim 15, wherein the encrypting of the obtained hash value includes obtaining information regarding a universal unique identification number field of a data field in a communication packet of the device as an encryption key; and encrypting the obtained hash value using the obtained encryption key.

17. The method of claim 15, wherein the shared key includes information of a major field and a minor field of a data field in a communication packet of the device.

18. The method of claim 15, wherein the encrypting of the obtained hash value includes encrypting the obtained hash value in an advanced encryption standard 128 encryption scheme having a length of 128 bits.

19. The method of claim 15, wherein the hash-based message authentication code algorithm is identical to a hash-based message authentication code algorithm stored in the terminal.

* * * * *